(12) United States Patent
Akita et al.

(10) Patent No.: US 9,699,962 B2
(45) Date of Patent: Jul. 11, 2017

(54) MOWER UNIT

(71) Applicant: Kubota Corporation, Osaka-shi (JP)

(72) Inventors: Masayuki Akita, Sakai (JP); Takeshi Komorida, Sakai (JP); Ryo Matsumoto, Sakai (JP); Masahiro Izumi, Sakai (JP); Azusa Furihata, Sakai (JP); Toshiki Kanai, Sakai (JP); Tomohisa Yamamoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/844,258

(22) Filed: Sep. 3, 2015

(65) Prior Publication Data

US 2016/0183454 A1 Jun. 30, 2016

(30) Foreign Application Priority Data

Dec. 26, 2014 (JP) ................................ 2014-266018

(51) Int. Cl.
*A01D 67/00* (2006.01)
*A01D 34/66* (2006.01)
*A01D 34/81* (2006.01)

(52) U.S. Cl.
CPC ........... *A01D 34/661* (2013.01); *A01D 34/81* (2013.01)

(58) Field of Classification Search
CPC ... B66F 7/243; A01D 34/64; A01D 2034/645; A01D 34/81; A01D 34/82
USPC ........................................ D12/217; 56/320.1
See application file for complete search history.

(56) References Cited

U.S. PATENT DOCUMENTS

| | | | | |
|---|---|---|---|---|
| 3,512,613 A | * | 5/1970 | Peterson | B60B 39/12 188/32 |
| 5,176,361 A | * | 1/1993 | Ayala, III | B66F 7/243 254/88 |
| 5,483,715 A | * | 1/1996 | Fogarty | B66F 7/243 14/69.5 |
| 6,135,420 A | * | 10/2000 | Johnston | B66F 7/243 254/88 |
| D493,408 S | * | 7/2004 | Chrisco | D12/217 |
| 6,993,801 B2 | * | 2/2006 | Marko | A63C 19/10 14/69.5 |
| 7,003,836 B2 | * | 2/2006 | Berg | B66F 7/243 14/69.5 |
| 7,040,461 B2 | * | 5/2006 | Chrisco | B60T 3/00 188/32 |
| 7,073,777 B2 | * | 7/2006 | Branstetter | B66F 7/243 254/1 |

(Continued)

FOREIGN PATENT DOCUMENTS

| | | | | |
|---|---|---|---|---|
| EP | 2649871 A1 | * | 10/2013 | A01D 34/62 |
| JP | 2014087326 A | * | 5/2014 | A01D 34/64 |

*Primary Examiner* — Árpád Fábián-Kovács
(74) *Attorney, Agent, or Firm* — The Webb Law Firm

(57) ABSTRACT

A mower unit is detachably mounted between front wheels and rear wheels of a mid-mount grass mower. The mower unit includes a blade cover having a top plate and a side plate extending from a circumferential edge of the top plate, a pair of right and left ride-over deck units provided on the top plate. Each ride-over deck unit includes a support deck fixed to an upper face of the top plate, a wheel guide member movable between a home position for storage in the support deck and a bridging position for bridging between the support deck and a ground surface, and a tethering member for tethering the support deck with the wheel guide member.

12 Claims, 15 Drawing Sheets

(56) References Cited

U.S. PATENT DOCUMENTS

| | | | | |
|---|---|---|---|---|
| 7,082,637 B1 * | 8/2006 | Griffin | ................... | B65G 69/30 14/69.5 |
| 7,104,524 B1 * | 9/2006 | Hidding | ................. | B66F 7/243 14/69.5 |
| D531,568 S * | 11/2006 | Davidian | ..................... | D12/217 |
| 7,222,838 B1 * | 5/2007 | Ji | ........................... | B66F 7/243 254/88 |
| 7,278,627 B2 * | 10/2007 | Jones | ..................... | B66F 7/243 254/88 |
| D567,471 S * | 4/2008 | Haimoff | ........................ | D34/33 |
| D577,651 S * | 9/2008 | Shaw | .......................... | D12/217 |
| 7,685,800 B2 | 3/2010 | Sugio et al. | | |
| 2004/0251661 A1 * | 12/2004 | Davis | ...................... | B25H 1/04 280/656 |
| 2007/0028577 A1 * | 2/2007 | Clement | ............... | A01D 34/64 56/17.2 |
| 2010/0096605 A1 * | 4/2010 | Fick | ....................... | B66F 7/243 254/88 |
| 2013/0111868 A1 * | 5/2013 | Sugio | ..................... | A01D 34/64 56/255 |

\* cited by examiner

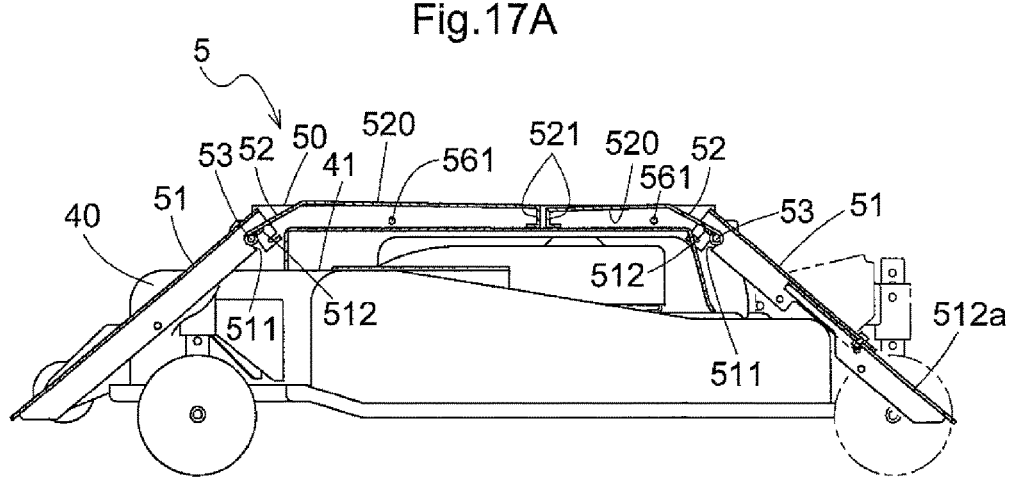
Fig.17A
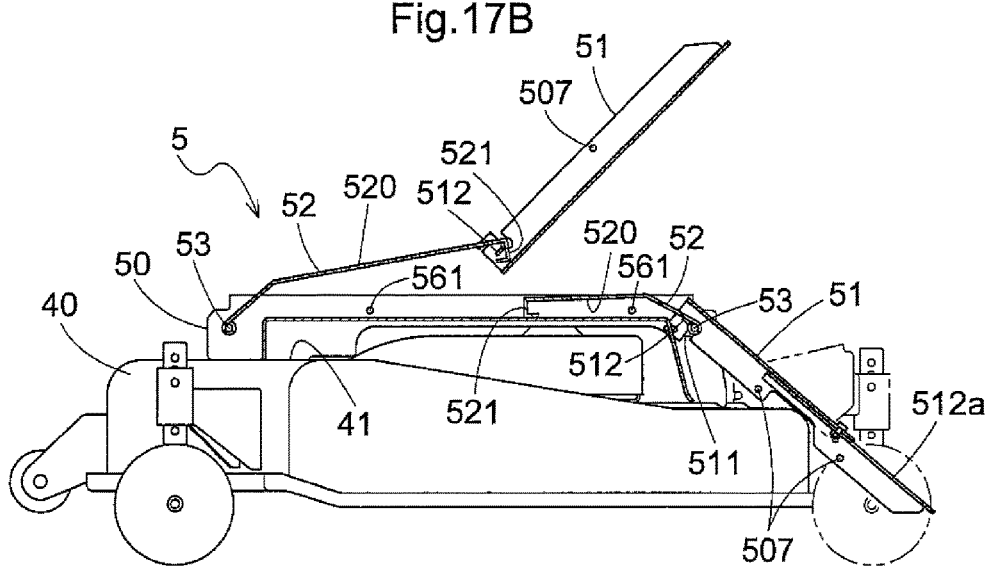
Fig.17B
Fig.18
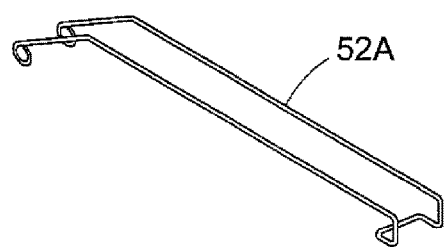

MOWER UNIT

CROSS-REFERENCE TO RELATED APPLICATION

This application claims priority to Japanese Patent Application No. 2014-266018 filed Dec. 26, 2014, the disclosure of which is hereby incorporated in its entirety by reference.

BACKGROUND OF THE INVENTION

Field of the Invention

The present invention relates to a mower unit that is to be detachably mounted between front wheels and rear wheels of a mid-mount type grass mower.

Description of the Related Art

When the above-described mower unit is to be mounted between front wheels and rear wheels of a grass mower, if the front wheels of the grass mower are driven to ride over the mower unit, this will eliminate need for an operation of inserting the mower unit between the front wheels and the rear wheels of the grass mower, thus providing convenience.

For instance, a grass mower disclosed in U.S. Pat. No. 7,685,800 gazette includes a ride-over assistance member which is slidably displaceable between a storage position and an in-use position. At the in-use position, the ride-over assistance member assists the grass mower in riding over the mover unit. The ride-over assistance member includes an engaging pin which is to be guided by an elongate slit formed in a guide member (support deck) which is fixed to a blade cover. In operation of the ride-over assistance member, as the engaging pin is guided in the slit, the member is shifted from the storage position (home position) to the in-use position (bridging position). Further, this slit is one-end open so as to allow removal of the engaging pin from the slit at the in-use position.

SUMMARY OF THE INVENTION

In view of the above-described state of the art, there is a need for an improved mower unit having a ride-over deck for a grass mower, the mower unit allowing posture change between an in-use position (bridging position) and a storage position (home position).

Solution

A mower unit according to the present invention is detachably mounted between front wheels and rear wheels of a mid-mount grass mower.

The mower unit according to the present invention comprises:
  a blade cover including;
    a top plate, and
    a side plate extending from a circumferential edge of the top plate;
  a pair of right and left ride-over deck units provided on the top plate, each ride-over deck unit including;
    a support deck fixed to an upper face of the top plate,
    a wheel guide member movable between a home position for storage in the support deck and a bridging position for bridging between the support deck and a ground surface, and
    a tethering member for tethering the support deck with the wheel guide member.

With the above-described configuration, when the grass mower rides over the mower unit, the wheel guide member functioning as an assistance member for bridging between the ground surface and the upper face of the blade cover is tethered by the tethering member to the support deck fixed to the upper face of the top plate. When bridging is provided between the support deck and the ground surface by moving the wheel guide member from the home position where the member is stored in the support deck to the bridging position, as a degree of freedom of the wheel guide member relative to the support deck is limited by the tethering member, the above movement can proceed with appropriate limitation. Further, this tethering member prevents the wheel guide member from moving far away from the support deck inadvertently.

According to one preferred embodiment of the invention:
  the support deck includes:
    a left side wall;
    a right side wall; and
    a cross pin interconnecting the left side wall and the right side wall;
  wherein at the home position, the wheel guide member is stored between the left side wall and the right side wall; and
  at the bridging position, the wheel guide member keeps an inclined posture with its one end supported by the cross pin.

With the above-described configuration, at the home position, the wheel guide member is sandwiched between the left side wall and the right side wall of the support deck, so that the risk of the wheel guide member coming into contact with any other member can be lessened and also the storage provides sleek favorable appearance. Further, as one end of the wheel guide member is supported by the cross pin which extends along a right/left direction of the support deck, the inclined posture thereof can be stable.

According to one preferred embodiment of the present invention:
  one end of the tethering member is pivotally attached to the cross pin; and
  the other end of the tethering member is detachably attached to a retaining portion provided in the wheel guide member.

With the above-described configuration, the wheel guide member can be shifted to the inclined posture in a smooth manner and also the inclined posture of the wheel guide member is made more stable thanks to the retention connection between this wheel guide member and the cross pin.

According to one preferred embodiment of the present invention:
  the wheel guide member forms a receiving hole for receiving the cross pin at the bridging position.

With the above-described configuration, with the connection/engagement between the cross pin and the receiving hole receiving this cross pin, simple and stable retention connection can be realized.

According to one preferred embodiment of the present invention:
  the wheel guide member comprises a channel including right and left side face portions and an upper face portion; and
  at the home position, the right and left side wall portions come into contact with the support deck, thereby to restrain movement of the wheel guide member in the right/left direction.

With the above-described configuration, stability of the storage of the wheel guide member at the home position is improved.

According to one preferred embodiment of the present invention:

the tethering member includes a tethering main body portion; and in the retaining portion provided in the wheel guide member, there is formed a slit through which the tethering main body portion passes when the tethering member moves from the home position to the bridging position.

With the above-described configuration, the shifting of the tethering member from the home position to the bridging position is provided by the tethering main body portion passing through the slit, that is, the tethering main body portion being guided by the slit. Therefore, the shifting can proceed in a smooth manner.

According to one preferred embodiment of the present invention:

the tethering member comprises a plate member.

According to one preferred embodiment of the present invention:

the tethering member comprises a bar-like member.

With the above-described configuration, the tethering member can be formed light weight. Further, if a material having good elasticity such as a piano wire is used as the bar-like member, the shifting performance of the wheel guide member can be improved.

According to one preferred embodiment of the present invention:

the tethering member comprises a wire.

With the above-described configuration, the tethering member can have even more simple and economical construction.

BRIEF DESCRIPTION OF THE DRAWINGS

FIG. 17A is a side view illustrating one step in a process of shifting a wheel guide member of the ride-over deck unit from the bridging position to the home position, FIG. 17B is a side view illustrating one step in a process of shifting a wheel guide member of the ride-over deck unit from the bridging position to the home position, FIG. 18 is a perspective view showing a further embodiment of the tethering member.

DETAILED DESCRIPTION OF THE PREFERRED EMBODIMENTS

Figure 1:
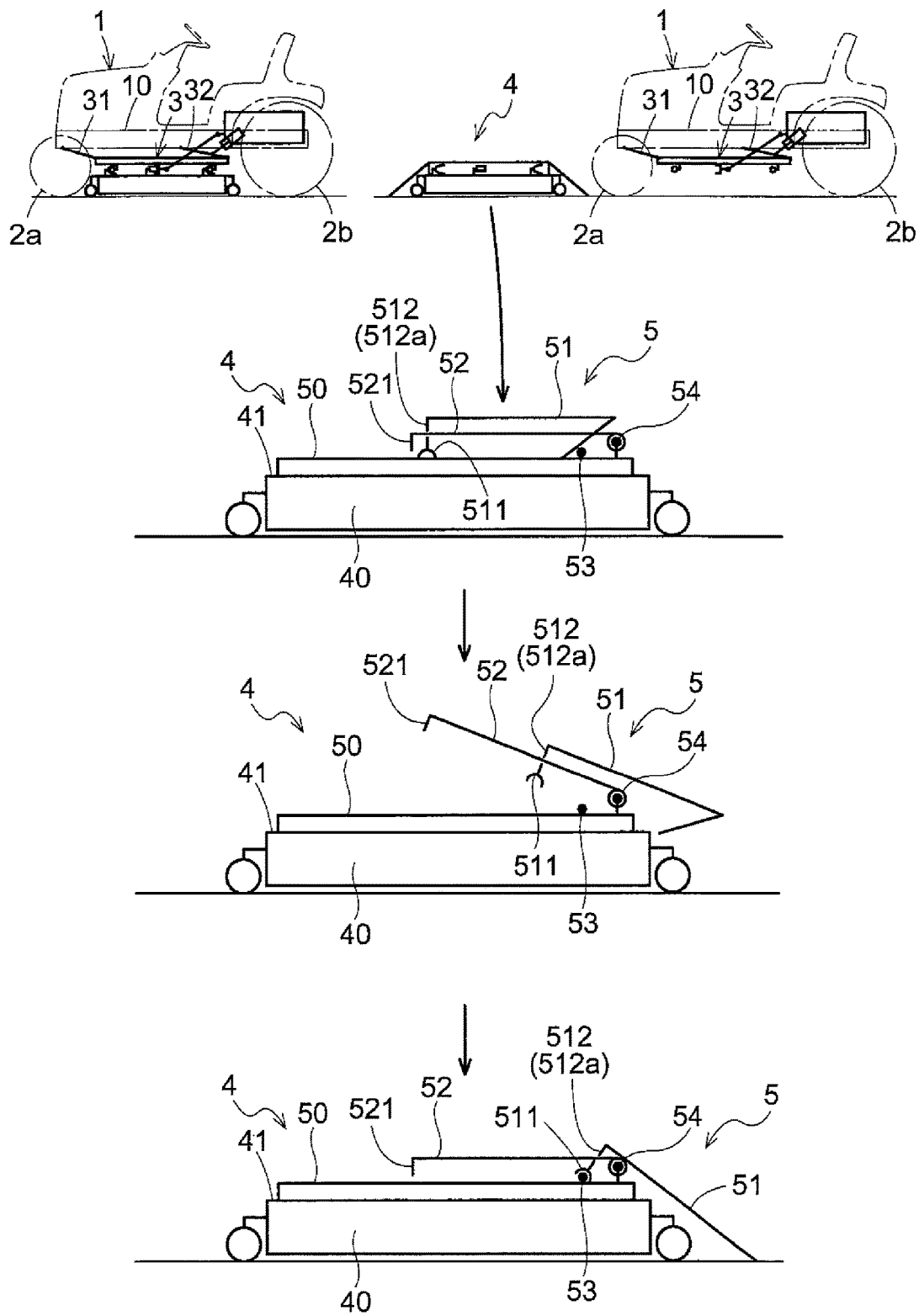
FIG. 1 is a schematic diagram for explaining a basic configuration of a ride-over deck unit of a mower unit according to the present invention.

Prior to explanation of an embodiment of a mower unit detachably mounted to a mid-mount grass mower relating to the present invention, a basic configuration of a ride-over deck unit of this mower unit will be explained. As shown in FIG. 1, a mower unit 4 according to the present invention is to be mounted between front wheels 2a and rear wheels 2b downwardly of a vehicle body 1 including a vehicle body frame 10 as a core component thereof included in the mid-mount grass mower (to be referred to simply as "grass mower" hereinafter). At a lower portion of the vehicle body frame 1, there is provided a lift link mechanism 3 consisting essentially of a pair of right and left front links 31 and rear links 32. In the case of the illustration in FIG. 1, the mower unit 4 is detachably attached to the lift link mechanism 3 via an intermediate structure 6.

A top plate 41 of a blade housing 40 of the mower unit 4 includes an engaged member to be connected/engaged with an engaging member included in the intermediate structure 6. Prior to a mounting operation of mounting the mower unit 4, the mower unit 4 will be placed on a traveling surface forwardly of the grass mower. Further, a pair of right and left ride-over deck units 5 arranged on the top plate 41 of the blade housing 40 of the mower unit 4 are switched respectively to a ride-over assisting posture for assisting the front wheels 2a of the grass mower to ride over the mower unit 4 smoothly. As the front wheels 2a have ridden over the mower unit 4a, coupling between the mower unit 4 and the vehicle body 1 of the grass mower is realized and connection/engagement between the engaging member of the intermediate structure 6 and the engaged member of the mower unit 4 and power transmission from the grass mower to the mower unit 4 are realized.

Next, with reference to FIG. 1, a process of shifting the ride-over deck unit 5 to the ride-over assisting posture will be explained. The ride-over deck unit 5 includes a support deck 50 fixed to an upper face of the top plate 41 of the blade housing 40, a wheel guide member 51 which is movable between a home position for storage in the support deck 50 and a bridging position for bridging between the support deck 50 and the ground surface, and a tethering member 52 for tethering the support deck 50 with the wheel guide member 51. Regarding the wheel guide member 51, two sets thereof are provided on the rear side and the front side for riding of the front wheels 2a on/off the mower unit 4. In FIG. 1, only the rear-side wheel guide member 51 is shown. Incidentally, in FIG. 1, the left side in the illustration is considered as the front side and the right side in the same is considered as the rear side, respectively.

The wheel guide member 51 is stored in the support deck 50 upwardly of the top plate 41 of the blade housing 40. At the bridging position, the rear end of the wheel guide member 51 is placed in contact with the ground surface and the front end of the member 51 is fixed to the support deck 50 at a rear region thereof. With this, the wheel guide member 51 functions as "a slope" used by the front wheel 2a when climbing up/down the housing 40. The support deck 50 includes a left side wall and a right side wall for forming a narrow elongate space therebetween. In this narrow elongate space, the wheel guide member 51 at the home position thereof is stored. With this, the wheel guide member 51 is covered laterally by the left side wall and the right side wall. For supporting the wheel guide member 51 in a rear region of the support deck 50, there is provided a first cross pin 53 for interconnecting the left side wall and the right side wall of the support deck 50. To this first cross pin 53, the wheel guide member 51 at the bridging position is supported. In this, in order to support and fix the wheel guide member 51 without error in its supported position, the wheel guide member 51 defines a receiving hole 511 which is opened downwards, and the first cross pin 53 is received in this receiving hole 511.

One end (rear end) of the tethering member 52 is pivotally supported to a second cross pin 54 provided in the support deck 50, in the vicinity of the first cross pin 53. Incidentally, it is also possible to employ a configuration of providing one cross pin 53 only, through co-use of the first cross pin 53 and the second cross pin 54. The other end (front end) of the tethering member 52 is connected to the wheel guide member 51. This connection between the tethering member 52 and the wheel guide member 51 is arranged in such a manner as to allow shifting of the wheel guide member 51 from the home position to the bridging position. For instance, the other end of the wheel guide member 51 will be detachably attached to a retaining portion provided in the wheel guide member 51. In the case of this arrangement, by releasing the retention by the retaining portion 512, shifting is made freely possible for the wheel guide member 51 from the home position to the bridging position. In the case of the example schematically shown in FIG. 1, the tethering member 52 includes a plate-like tethering main body portion 520 and a free end of this tethering main body portion 520 is bent to form a hook portion 521. Further, the wheel guide member 51 forms a slit 512a through which the tethering main body portion 520 can pass freely. When the wheel guide member 51 is shifted from the home position to the bridging position, as shown in FIG. 1, there is provided a guiding function between the slit 512a and the tethering main body portion 520. However, as the leading end portion of the tethering member 52 is provided as the hook portion 521, removal of the hook portion 521 from the slit 512a requires significant change in the posture of the wheel guide member 51. For this reason, the slit 512a functions as a "retaining portion 512" for the tethering member 52.

Figure 2:
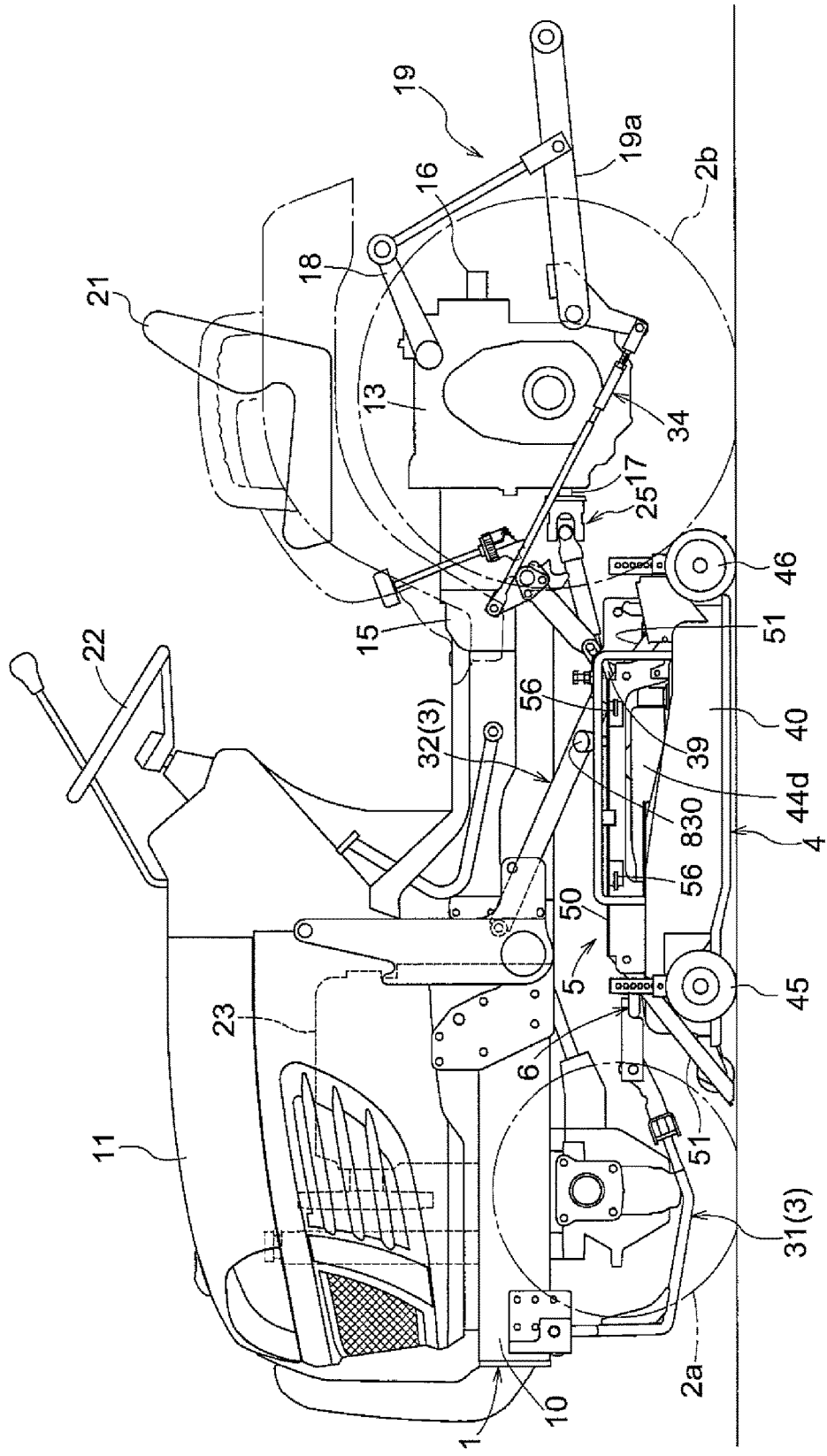
FIG. 2 is a side view showing a mid-mount grass mower as one specific embodiment of the present invention.

Next, with reference to the accompanying drawings, there will be explained one specific embodiment of the gross mower having the mower unit 4 according to the present invention. FIG. 2 is a side view showing the grass mower with the mower unit 4 mounted thereto. This mower unit 4 has the basic configuration which has been explained above with reference to FIG. 1. This grass mower can be used also as a conventional tractor, with detachment of the mower unit 4 mounted between the front wheels 2a and the rear wheels 2b. In a front half portion of the vehicle body frame 10 of the grass mower, there is mounted a water-cooled diesel engine (to be referred to as "engine 23" hereinafter) covered by a hood 11. And, in a rear half portion of the vehicle body frame 10, a driver's seat 21 is provided. The front wheels 2a are steerable wheels which are operated by a steering wheel 22 and these wheels 2a are also drive wheels. The rear wheels 2b are drive wheels. That is, this grass mower can run in four-wheel drive mode. In the rear half portion of the vehicle body frame 10, a transmission case (to be referred to as "T/M case 13" hereinafter) is provided.

Power from the engine 23 is transmitted to a hydrostatic stepless speed changer (to be referred to as "HST 15" hereinafter) connected to a front portion of the T/M case 13 via a transmission shaft (not shown) constituting a power transmission mechanism 24. The power from the HST 15 is transmitted to a gear speed changer (not shown) incorporated inside the T/M case 13. The power from the gear speed changer is divided inside the T/M case 13 into front wheel driving power and a rear wheel driving power. The front wheel driving power is transmitted via a front wheel power transmission mechanism extending from the T/M case 13 to the right and left front wheels 2a to the right and left front wheels 2a. The rear wheel driving power is transmitted via a rear wheel power transmission mechanism extending from the T/M case 13 to the right and left rear wheels 2b to the right and left rear wheels 2b.

On the other hand, the power inputted to the HST 15 is transmitted in distribution to a first PTO (power takeoff) shaft 16 provided at the rear end of the T/M case 13 and oriented rearward and a second PTO shaft 17 provided at a bottom portion of the T/M case 13 and oriented forward. The first PTO shaft 16 and the second PTO shaft 17 together constitute a blade power transmission mechanism 25. The second PTO shaft 17 supplies power to the mower unit 4.

In a rear portion of the T/M case 13, there are provided such components as a pair of right and left lift arms 18 which are vertically pivoted by operations of lift cylinders provided therein (not shown) and a link mechanism 19 which is pivoted up/down in association with the vertical pivotal movements of the above lift cylinders. As the lift cylinders, there are employed single-action type hydraulic cylinders. The link mechanism 19 includes e.g. a pair of right and left lower links 19a that allow attachment and detachment of an implement (not shown) such as a rotary cultivator, a plow, etc.

In this embodiment, between the vehicle body frame 10 and the mower unit 4, there are interposed the lift link mechanism 3 and the intermediate structure 6. The lift link mechanism 3 supports the mower unit 4 in suspension via the intermediate structure 6, with allowing lifting up/down of the mower unit 4. The intermediate structure 6 functions as an "adaptor". Namely, the intermediate structure 6, on one side thereof, is operably connected to the lift link mechanism 3 and the structure 6, on the other side thereof, is operably connected to the mower unit 4.

The lift link mechanism 3 includes a pair of right and left front links 31 (pivotal links), when assuming a rearwardly downward inclined posture, configured to interconnect the front portion of the vehicle body frame 10 and the front portion of the intermediate structure 6, and a pair of right and left rear links 32 (pivotal links), when assuming a rearwardly downward inclined posture, configured to interconnect a front/rear intermediate portion of the vehicle body frame 10 and the rear portion of the intermediate structure 6. The lift link mechanism 3 constitutes a parallel link for lifting up/down the mower unit 4 under a predetermined mowing posture via the intermediate structure 6. The right and left rear links 32 are coupled to the right and left lower links 19a of the link mechanism 19 via a coupling mechanism 34. As the mower unit 4 is connected to the vehicle body frame 10 via the lift link mechanism 3 and the intermediate structure 6 and also the lift link mechanism 3 is coupled to the link mechanism 19 via the coupling mechanism 34, the mower unit 4 can be lifted up/down at the lower body portion of the tractor.

Figure 3:
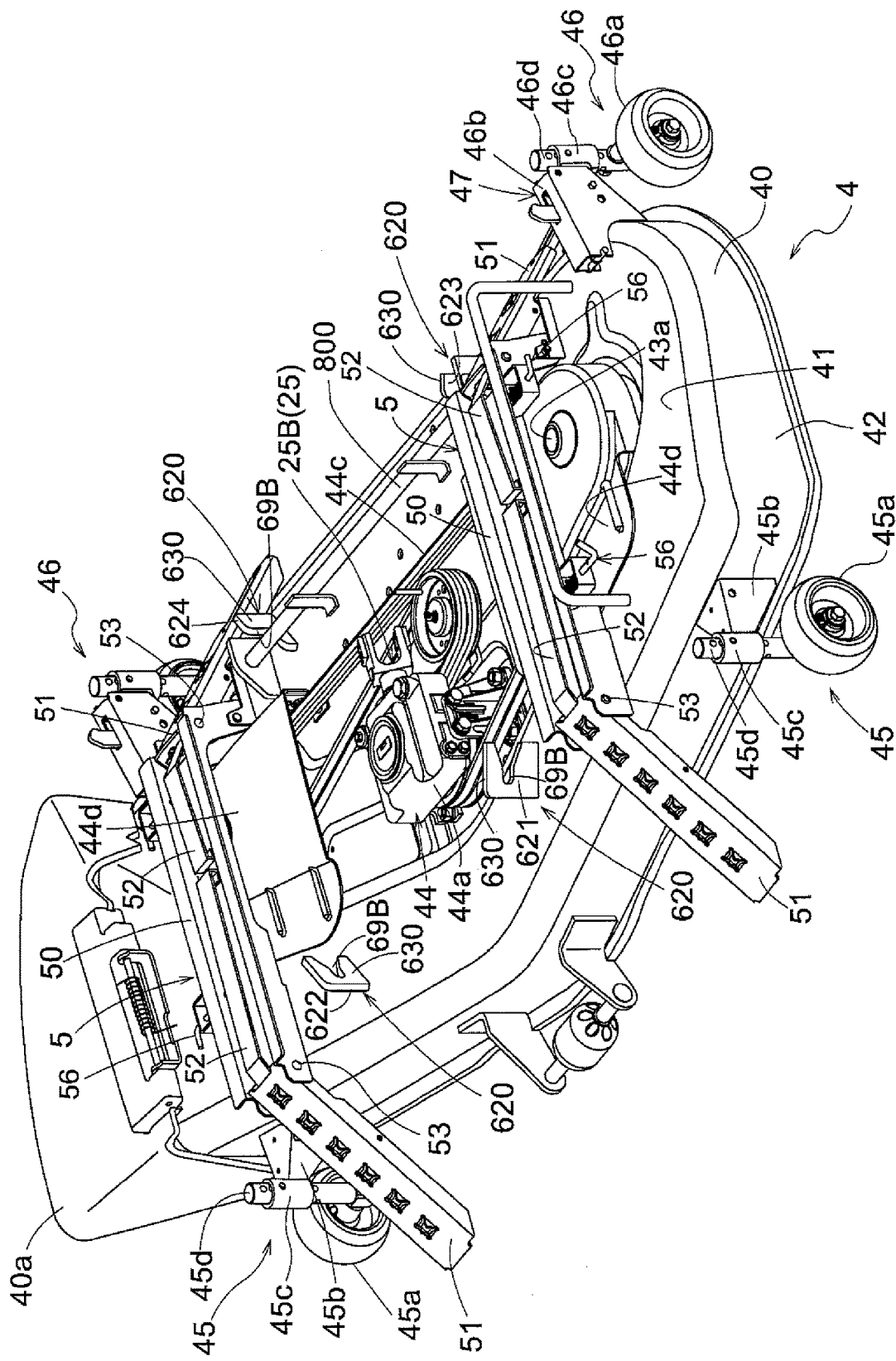
FIG. 3 is a perspective view showing the mower unit.
Figure 4:
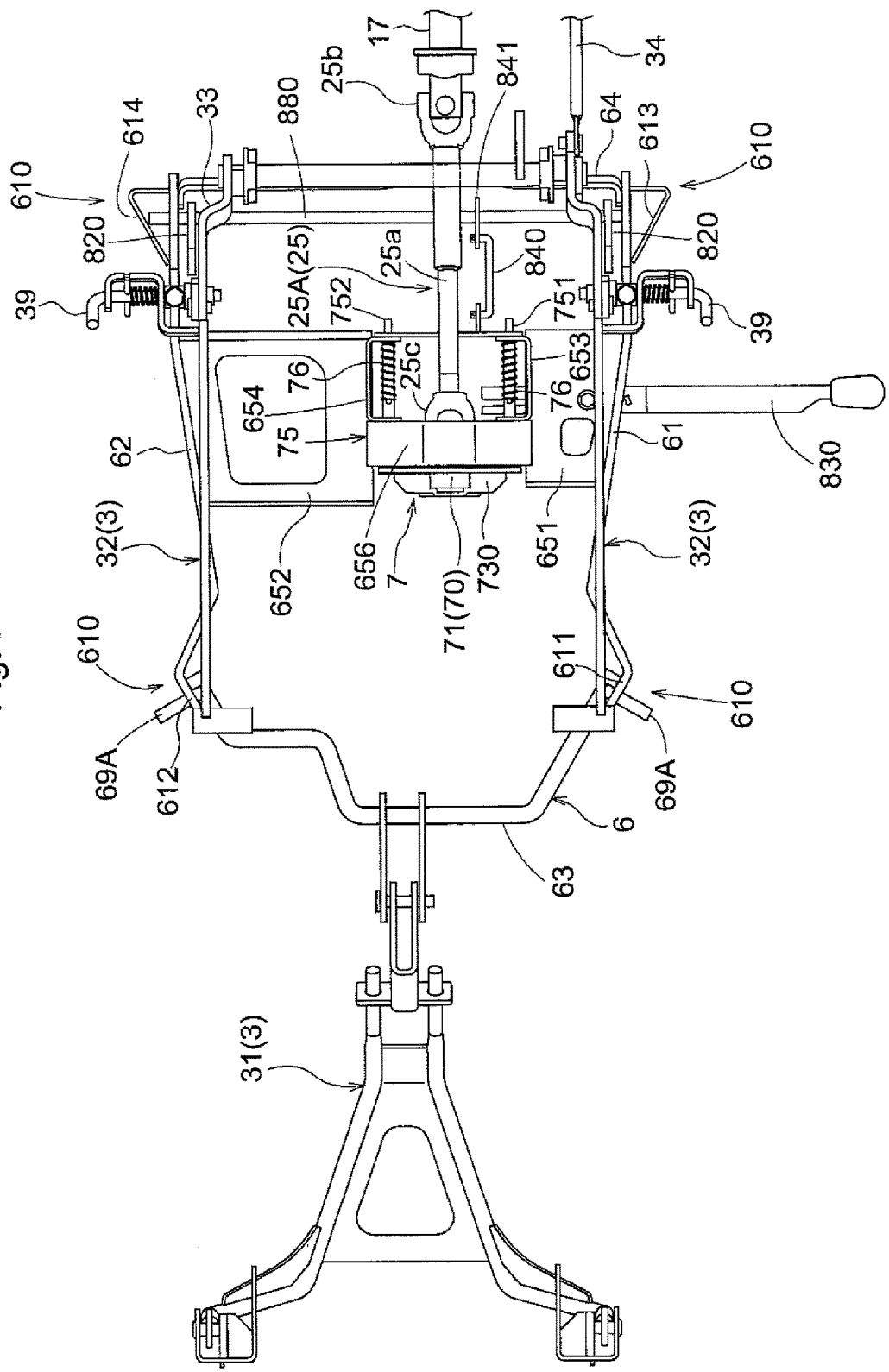
FIG. 4 is a plane view showing a lift link mechanism and an intermediate structure.
Figure 5:
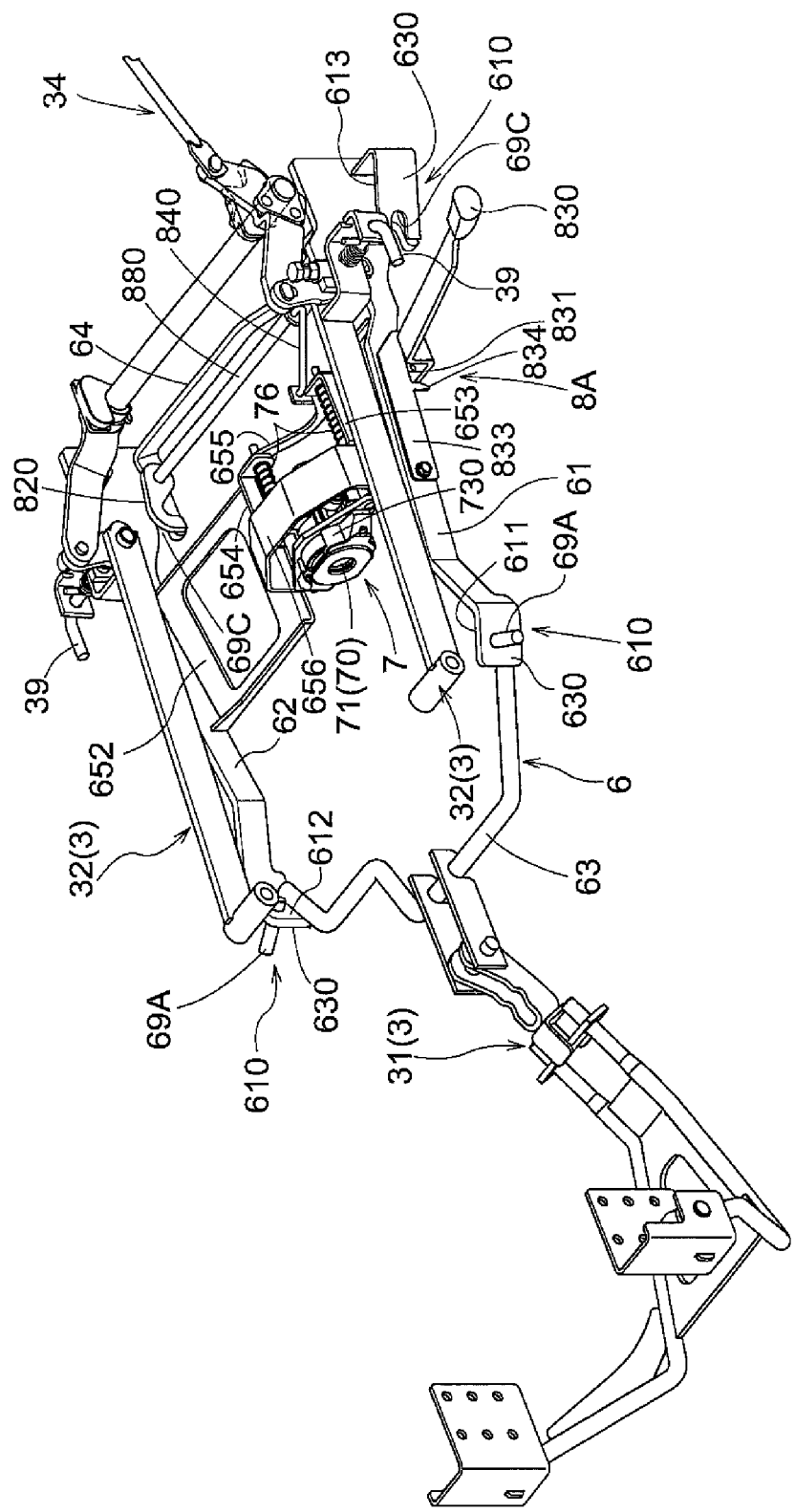
FIG. 5 is a perspective view showing the lift link mechanism and the intermediate structure.
Figure 6:
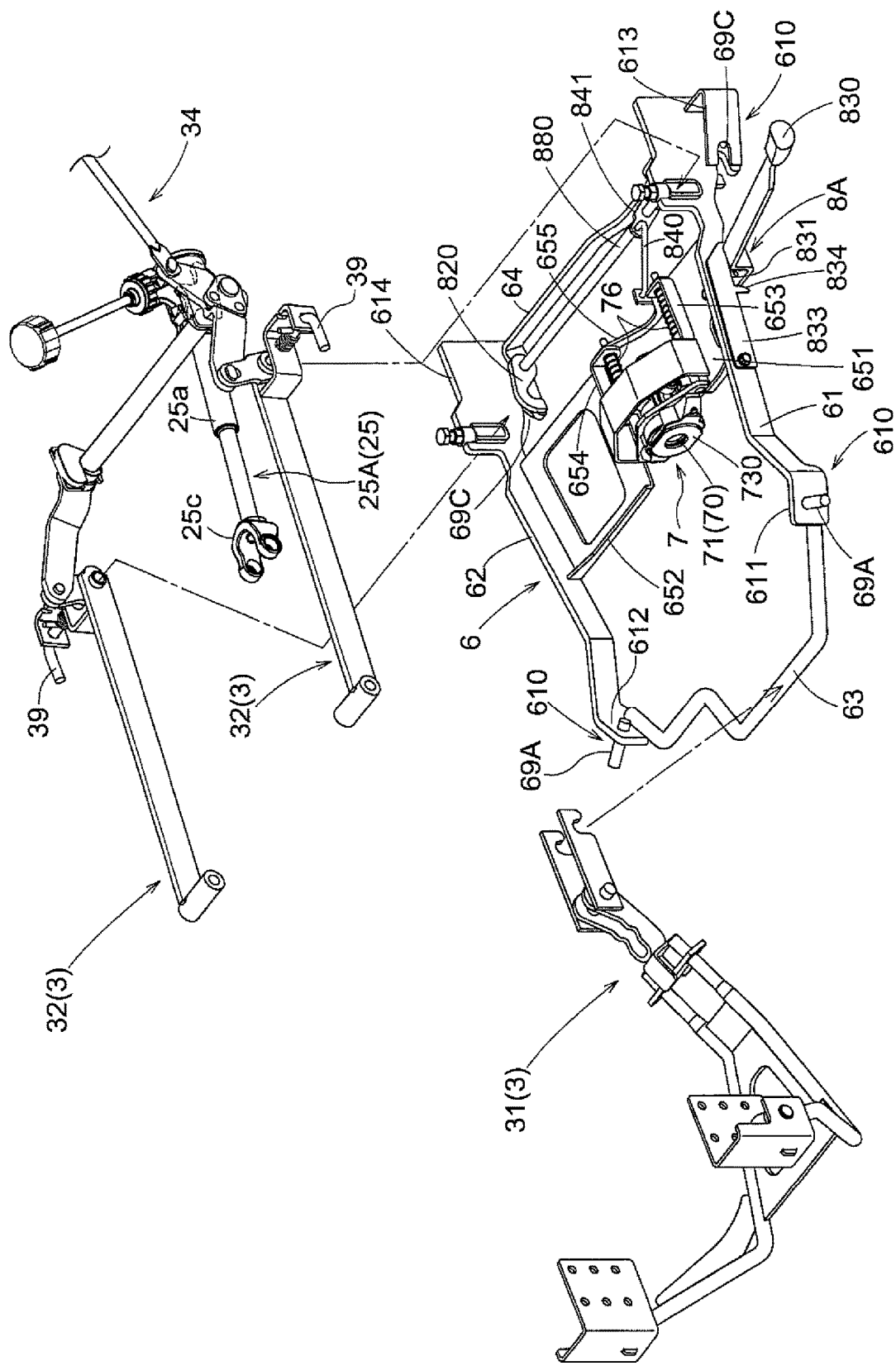
FIG. 6 is an exploded perspective view showing the lift link mechanism and the intermediate structure individually.

FIG. 2 shows the lift link mechanism 3, the intermediate structure 6 and the mower unit 4. In this FIG. 2 illustration, the intermediate structure 6 and the mower unit 4 are connected. FIG. 3 shows the mower unit 4 alone. FIGS. 4 through 6 show the intermediate structure 6 being coupled to the lift link mechanism 3. In FIG. 6, there is shown a state where the front link 31, the rear link 32 and the intermediate structure 6 are separated from each other. As may be apparent from FIG. 3 illustration, though not confirmed in FIG. 3, the mower unit 4 includes a vertically oriented rotary shaft 43a for rotating clockwise three blades 43 (see FIG. 8) arranged along a vehicle body transverse direction in a plane view and a blade housing 40 covering these blades 43 from above. The blade housing 40 includes a top plate 41 and a lateral plate 42 extending downwards from the circumferential edge of the top plate 41. In the top plate 41 of the blade housing 40, a power distribution mechanism 44 for driving the blades is provided. Further, there are detachably attached belt covers 44d which cover a belt transmission mechanism 44c of the power distribution mechanism 44 from above, one belt cover 44d being omitted in the FIG. 3 illustration. In a front region of the blade housing 40, there is formed an upward bulging portion extending between the right and left sides, thus providing a cut grass conveyance passage inside the blade housing 40. And, at the right end of the blade housing 40 forming an exit of this conveyance passage, a discharge cover 40a is attached.

Namely, the mower unit 4 is configured as a side-discharge type in which an amount of grass cut by the three blades 43 is discharged through the conveyance passage formed inside the blade housing 40 by a conveying air current generated in association with rotation of each blade 43 to the outside from the discharge exit at the right end.

Figure 7A:
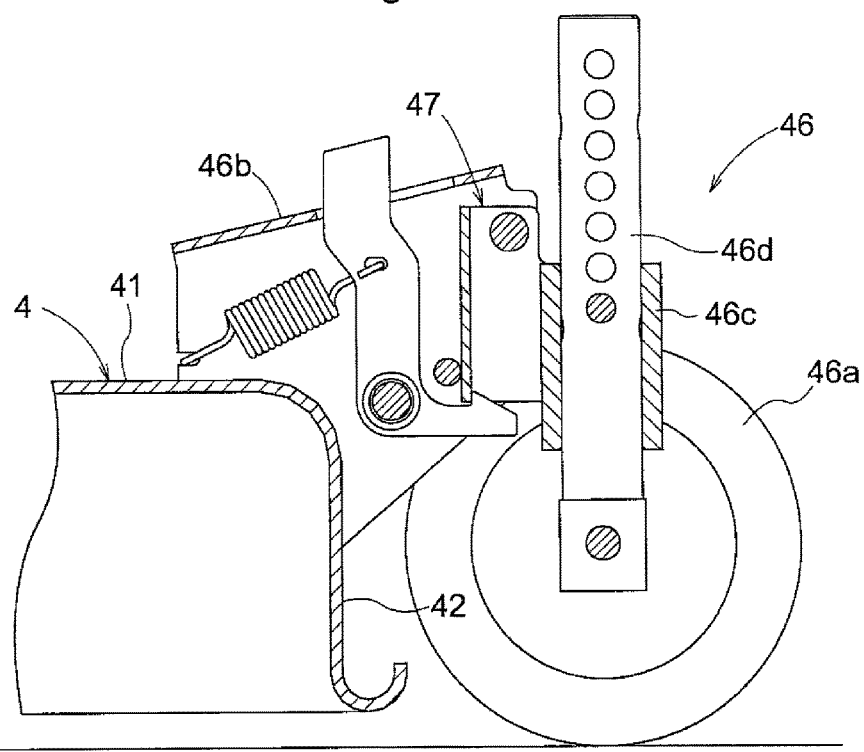
FIG. 7A is a section view showing a flip-up mechanism of a gauge wheel, illustrating a state when a rear gauge wheel is placed in contact with a ground surface.
Figure 7B:
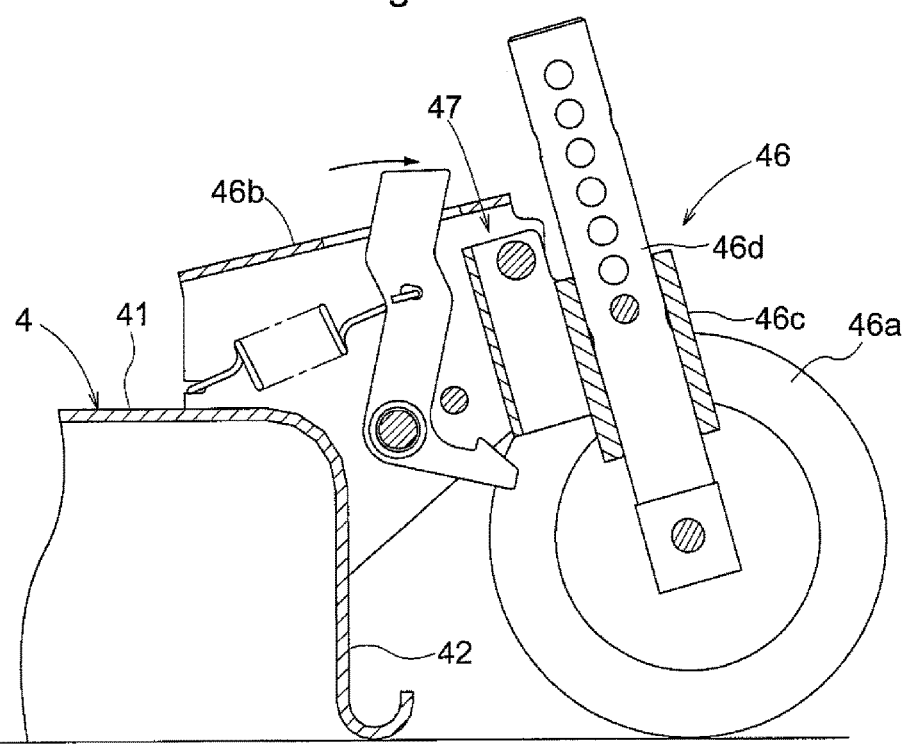
FIG. 7B is a section view showing the flip-up mechanism of the gauge wheel, illustrating a state when the rear gauge wheel is flipped up.

As shown in FIG. 3, at the right and left end portions of the front portion and the rear portion of the blade housing 40, there are provided height-adjustable front gauge wheel units 45 and height-adjustable rear gauge wheel units 46. Incidentally, FIG. 7A, FIG. 7B show the rear gauge wheel units 46 alone in an enlarged scale. Each front gauge wheel unit 46 includes a support bracket 45b having a vertical boss portion 45c and a front gauge wheel 45a fixed to a slide support shaft 45d slidably inserted in the vertical boss portion 45c. The side support shaft 45d is fixed with a pin to a selected position. Each rear gauge wheel unit 46, as shown in FIGS. 7A and 7B in details, includes a support bracket 46b having a vertical boss portion 46c and flipped up by a flip-up mechanism 47 and a rear gauge wheel 46a mounted to a support shaft fixed to a slide support shaft 46d slidably inserted into the vertical boss portion 46c. The slide support shaft 46d too is fixed with a pin to a selected position. In this embodiment, the flip-up mechanism 47 supports a perpendicular posture (see FIG. 7A) of the slide support shaft 45d by retaining the vertical boss portion 46c slidably supported by a horizontal axis relative to the support bracket 46b by means of a spring-urged pivot arm. And, the flip-up mechanism 47 renders the slide support shaft 45d to an inclined posture (see FIG. 7B) by releasing the retention by the pivot arm. That is, the flip-up mechanism 47 has a function of flipping up the rear gauge wheel 46a by releasing the spring urging. When the rear gauge wheel 46a is flipped up, the mower end of the lateral plate 42 of the blade housing 40 comes into contact with the ground surface. With this, a large frictional force is applied between the blade housing 40 and the ground surface, so movement of the blade housing 40 will be restricted in the event of application of an external force thereto.

Figure 8:
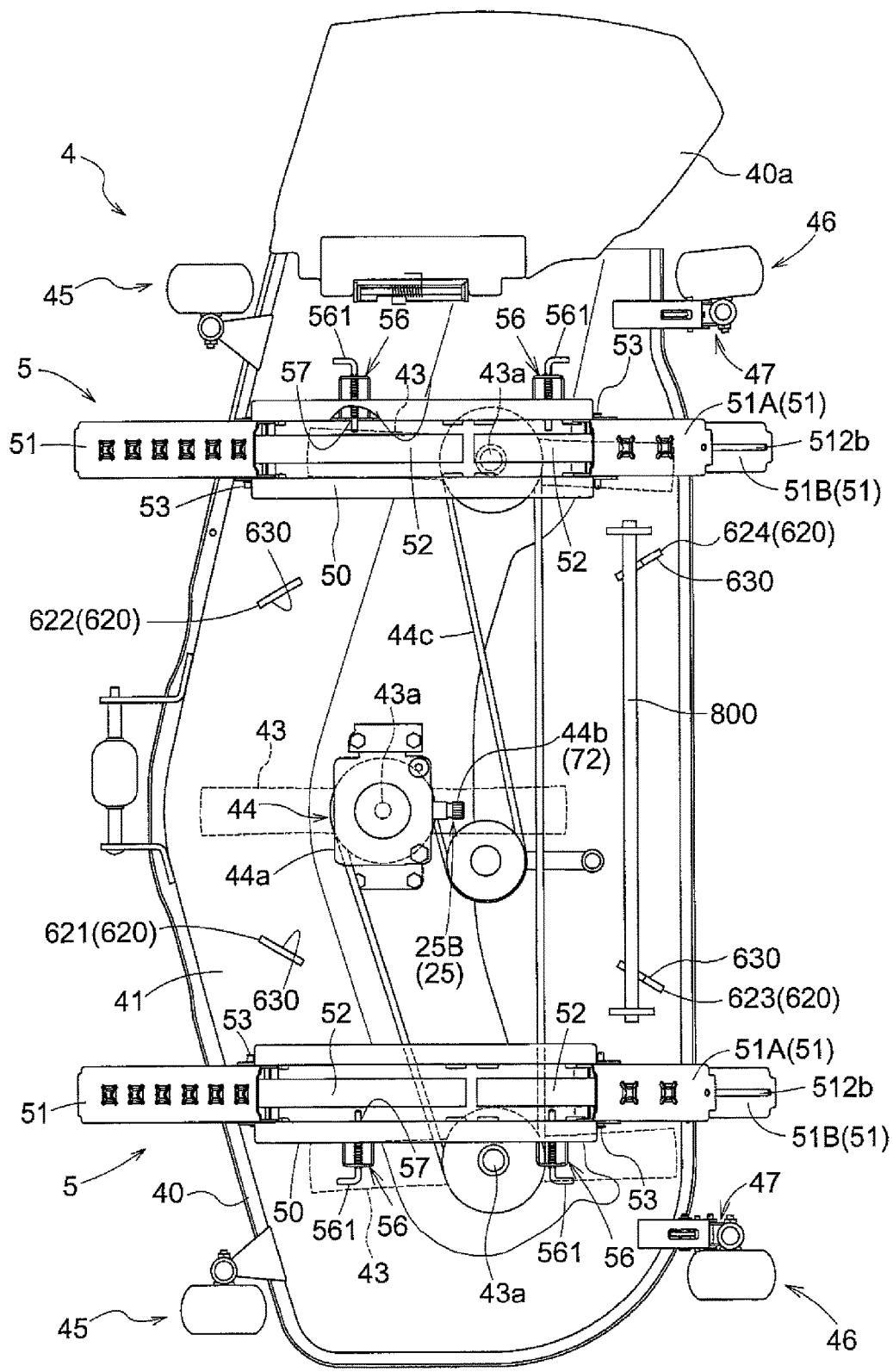
FIG. 8 is a plane view showing a mower unit singly.

As may be readily understood from FIG. 8 illustration, the power distribution mechanism 44 includes the belt transmission mechanism 44c which provides a power received by an input shaft 44b (a constituent of a mower side power transmission mechanism 25B) extending rearwards from a housing 44a disposed at the center of the blade housing 40 in distribution to three rotary shafts 43a on which the respective blades 43 are fixed.

Next, with reference to FIGS. 4 through 6, FIG. 9 and FIG. 10, an embodiment of the intermediate structure 6 will be explained. This intermediate structure 6 comprises a frame structure consisting of a first member 61 and a second member 62 which respectively extend along the vehicle body front/rear direction in a spaced relationship with each other, a front connecting member 63 connecting front ends of the first member 61 and the second member 62 with each other, and a rear connecting member 64 connecting rear ends of the first member 61 and the second member 62. The front connecting member 63 is a bar-like member having a convex projection at the center thereof. And, to this projection of the front connecting member 63, a hook-like free end portion of the front link 31 of the lift link mechanism 3 is slidably retained. At the rear portions of the first member 61 and the second member 62, a free end of the rear link 32 of the lift link mechanism 3 is pivotally connected via a link pin 39.

For realizing coupling between the intermediate structure 6 and the blade housing 40, the intermediate structure 6 includes an engaging portion 610. As shown in FIG. 8, in the top plate 41 of the blade housing 40, there is provided an engaged portion 620 engageable with the engaging portion 610. In this embodiment, the engaging portion 610 consists essentially of a vehicle body side first front guide 611 which is a bent portion formed in the region of the first member 61 bonded to the front connecting member 63, a vehicle body side second front guide 612 which is a bent portion formed in the region of the second member 62 bonded to the front connecting member 63, a vehicle body side first rear guide 613 which is a bracket-like member provided at the rear end of the first member 61 and projecting outwards therefrom, and a vehicle body side second rear guide 614 which is a bracket-like member provided at the rear end of the first member 61 and projecting outwards therefrom.

The engaged portion 620 consists essentially of a mower side first front guide 621 and a mower side second front guide 622 disposed erect in distribution on the right and left sides in the front region of the top plate 41, and a mower side first rear front guide 623 and a mower side second rear guide 624 disposed erect in distribution on the right and left sides in the rear region of the top plate 41. The combination of the mower side first front guide 621 and the vehicle body side first front guide 611, the combination of the mower side second front guide 622 and the vehicle body side second front guide 612, the combination of the mower side rear guide 623 and the vehicle body side first rear guide 613, and the combination of the mower side second rear guide 624 and the vehicle body side second rear guide 614 are respectively arranged at at mutually engaging position under the connected state between the intermediate structure 6 and the blade housing 40.

In this embodiment, the vehicle body side first front guide 611 and the vehicle body side second front guide 612 each includes an engaging pin 69A which extends horizontally in an obliquely forward direction. The vehicle body side first rear guide 613 and the vehicle body side second rear guide 614 each includes an elongate slot 69C extending horizontally in the obliquely forward direction and opened to the rear side. Further, as shown in FIG. 3, the mower side first front guide 621 and the mower side second front guide 622 each includes an elongate slot 69B extending horizontally in the obliquely rearward direction and opened to the rear side.

As shown in FIG. 8, in the rear side region of the top plate 41 of the blade housing 40, a locking fixing rod 800 extends in the vehicle body transvers direction (lateral direction), which constitutes a second locking mechanism 8B as one of locking mechanisms 8 to be described in details later. The mower side second rear guide 614 and the vehicle body side second rear guide 614 respectively defines a cutout for avoiding interference with the locking fixing rod 800.

The vehicle body side first front guide 611, the vehicle body side second front guide 612, the vehicle body side first rear guide 613, the vehicle body side second rear guide 614, the mower side first front guide 621, the mower side second front guide 622, the mower side first rear guide 623 and the mower side second rear guide 624 each has an inclined face that extends closer to the vehicle body longitudinal centerline as it extends forwardly. And, the respectively corresponding inclined faces are formed to come into substantial contact with each other under the connected state between the intermediate structure 6 and the blade housing 40. Namely, these inclined faces function as guide faces for guiding the intermediate structure 6 to the position for connection with the blade housing 40 when the grass mower advances relative to the blade housing 40 placed on the ground surface. More particularly, a guide face in the form of an inclined face is formed in the engaging portion 610 of the intermediate structure 6 and the engaged portion 620 of the blade housing 40, respectively, and these guide faces come into contact with each other in association with movement in the vehicle body front/rear direction.

Figure 9:
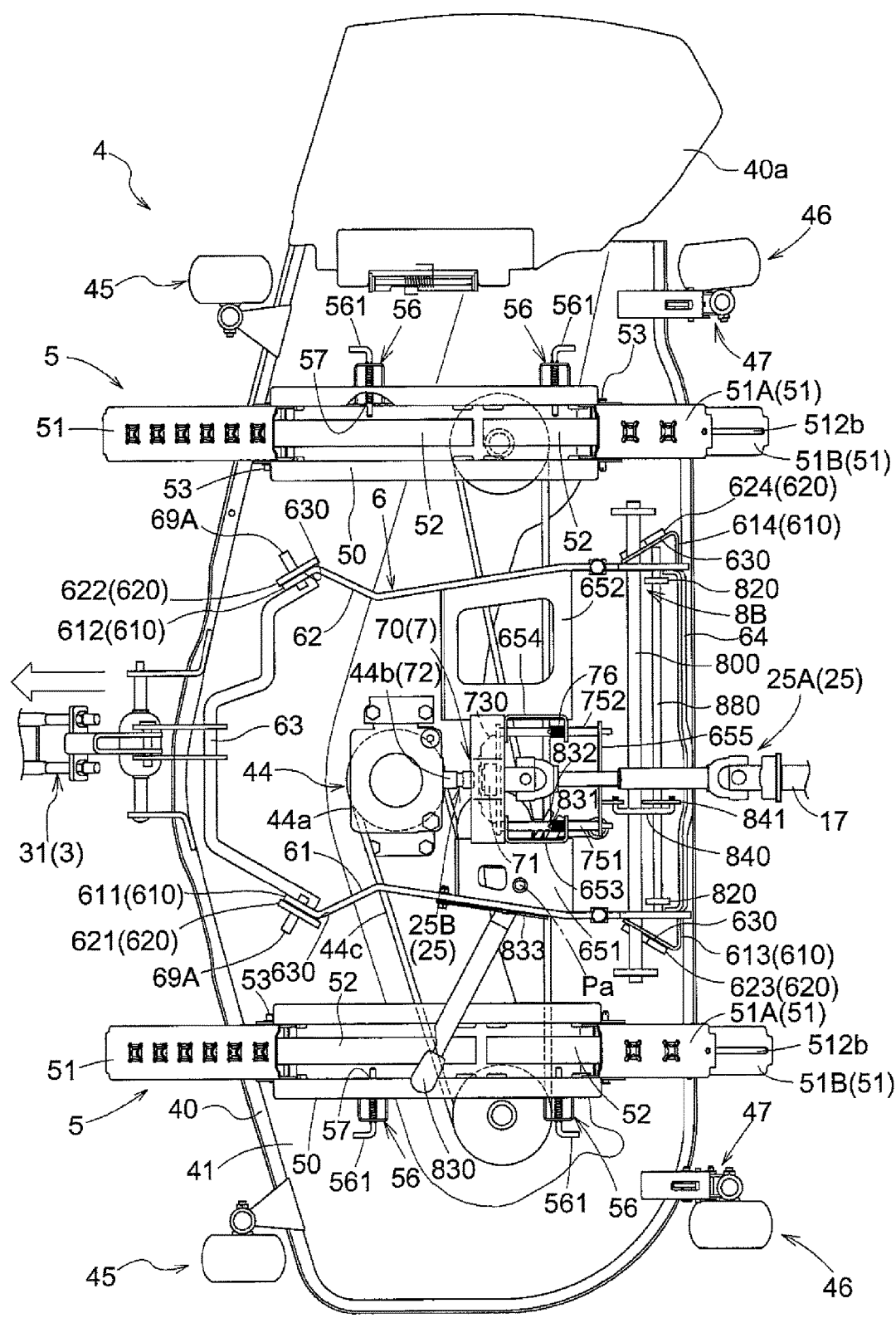
FIG. 9 is a plane view showing the mower unit and the intermediate structure prior to connection of a power coupling mechanism.
Figure 10:
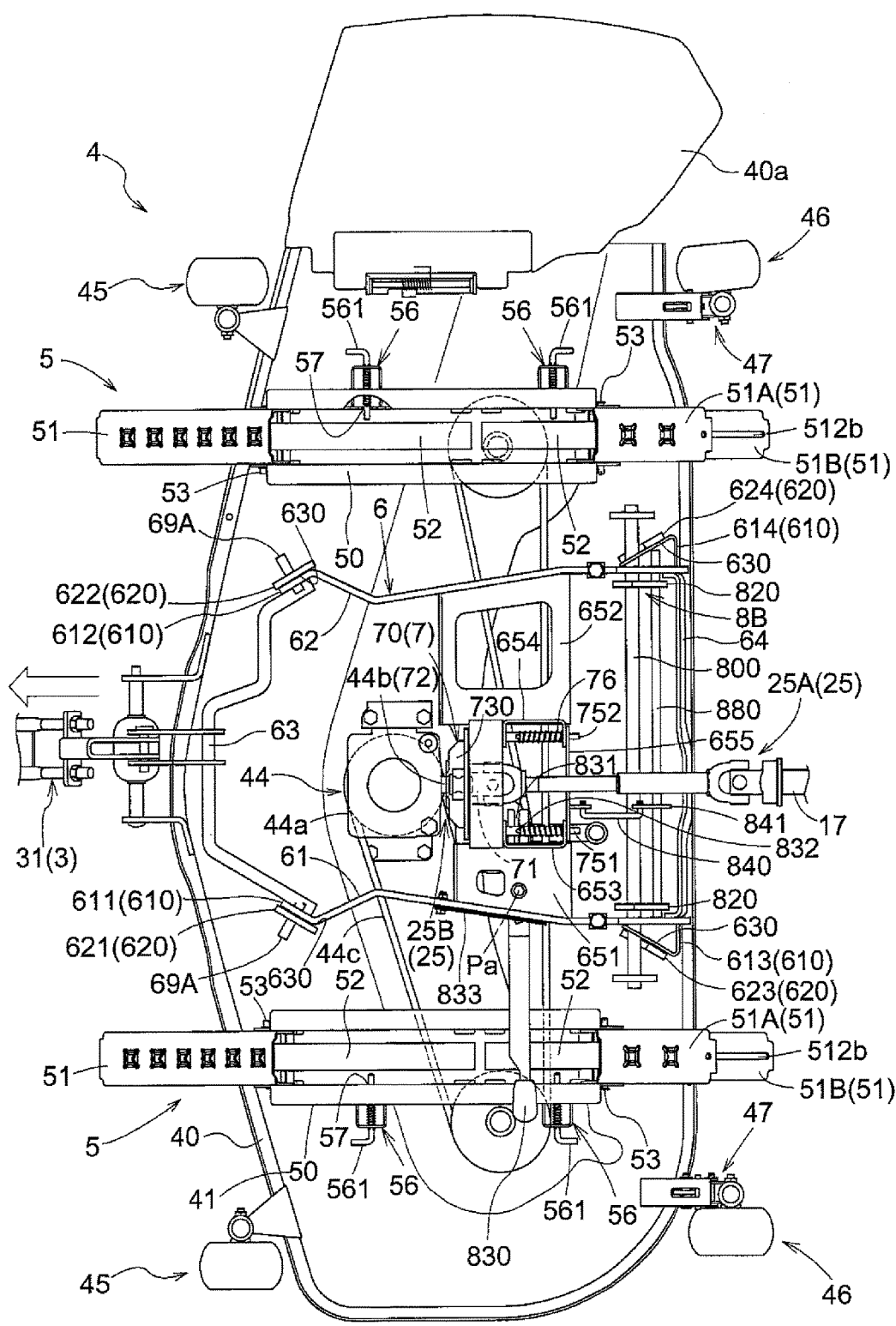
FIG. 10 is a plane view showing the mower unit and the intermediate structure after connection of the power coupling mechanism.

The second PTO shaft 17 transmits power to the input shaft 44b (see FIG. 8) of the power distribution mechanism 44 of the mower unit 4. The blade power transmission mechanism 25 between the second PTO shaft 17 and the input shaft 44b, as may be understood from FIG. 9 and FIG. 10 illustrations, is divided into a vehicle body side power transmission mechanism 25A and a mower side power transmission mechanism 25B. The vehicle body side power transmission mechanism 25A and the mower side power transmission mechanism 25B can be detached from or connected to each other via a power connecting mechanism 7 included in the intermediate structure 6. In this embodiment, the mower side power transmission mechanism 25B includes the input shaft 44b whereas the vehicle body side power transmission mechanism 25A includes a relay shaft 25a, a first universal joint 25b and a second universal joint 25c. The first universal joint 25b connects the second PTO shaft 17 with the relay shaft 25a. The second universal joint 25c connects the relay shaft 25a which acts as an output shaft of the vehicle body side power transmission mechanism 25A with the input shaft 44b which acts as an input shaft of the vehicle side power transmission mechanism 25A. In this second universal joint 25c, there is formed a spline type connecting portion which enables connection and detachment to/from the input shaft 44b. And, the mechanism for implementing these connection and detachment is the power connecting mechanism 7. A detaching state of the power connecting mechanism 7 is shown in FIG. 9 and its connecting state is shown in FIG. 10.

As may be understood from FIG. 9 and FIG. 10 illustrations, in this embodiment, the power connecting mechanism 7 includes a coupling main body 70 which constitutes the second universal joint 25c, a coupling holding portion 730 which surrounds the coupling main body 70 and holds this coupling main body 70 with its inner circumferential face, and an attachment unit 75 for attaching this coupling holding portion 730 to the intermediate structure with allowing displacement thereof along the vehicle body front/rear direction. The coupling main body 70 includes a first connecting end portion 71 to be connected to the relay shaft 25a and a second connecting end portion 72 to be connected to the input shaft 44b. The second connecting end portion 72 has an inner circumferential face forming a spline for engagement with a spline formed in the input shaft 44b. The coupling holding portion 730 is a plate-like boss having extension pieces on its opposed sides and to a boss of this plate-like boss, the coupling main body 70 is fixed. The coupling holding portion 730 has a function of realizing spline engagement between the input shaft 44b and the second connecting portion 72 in association with a movement thereof toward the input shaft 44b of the power distribution mechanism 44. And, such movement of the coupling holding portion 730 is realized by the attachment unit 75.

The attachment unit 75 is configured as a slider mechanism for moving the coupling holding portion 730. In response to a force to this slider mechanism from the outside (e.g. an operation force by a driver), the coupling holding portion 730 is moved, thereby to realize the connection of the power connecting mechanism 7. In this embodiment, for causing a translation movement of the coupling holding portion 730, there are provided a first leg portion 751 and a second leg portion 752 as a pair of right and left slider rods and guide slots as slider guides for the respective slider rods. The first leg portion 751 is a bar-like member fixed to the left side extension piece of the coupling holding portion 730 and extending rearwards. The second leg portion 752 is a bar-like member fixed to the right side extension piece of the coupling holding portion 730 and extending rearwards. The rear ends of the first leg portion 751 and the second leg portion 752 are connected to each other by being connected with a connecting plate 753. The attachment unit 75 includes, as supporting decks, a first base plate 651 fixed to the first member 61 and a second base plate 652 fixed to the second member 62. To respective inner edges of the first base plate 651 and the second base plate 652, a first bracket 653 and a second bracket 654 are fixed. Between the first bracket 653 and the second bracket 654, there is formed a gap through which the relay shaft 25a can pass. The first bracket 653 and the second bracket 654 each comprises a C-shaped bent plate as seen in a plane view, with through holes being formed at its bent opposed end regions. These through holes function as guide holes for the first leg portion 751 and the second leg portion 752 respectively. That is, the first leg portion 751 and the second leg portion 752 are inserted in the through holes formed coaxially at the opposed ends of the first bracket 653 and the second bracket 654 and slidably supported to the first bracket 653 and the second bracket 654.

Figure 11:
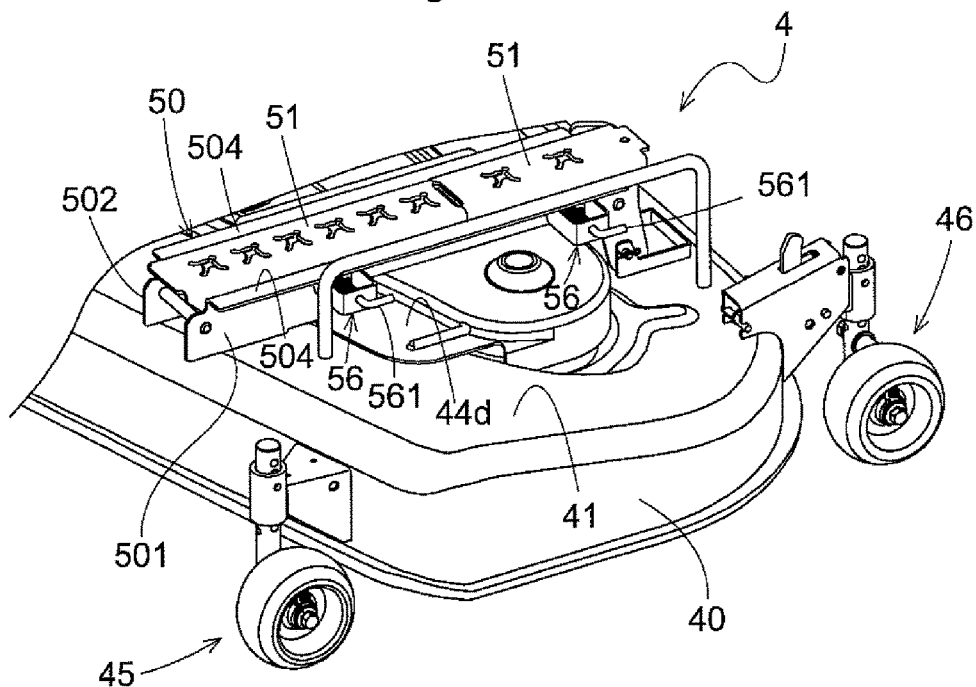
FIG. 11 is a perspective view showing the ride-over deck unit at a home position.

Incidentally, an arch-shaped cover 656 that partially covers from above the second universal joint 25c included in the relay shaft 25a coupled to the input shaft 44b of the mower-side power transmission mechanism 25B is shown as being detached in the FIG. 11 illustration, but this is shown as being attached in the FIG. 9 illustration and FIG. 10 illustration.

An operational lever 830 provided for selectively realizing a coupled state and a detached state of the power connecting mechanism 7 is configured here as an operational lever 830 which is pivoted about a pivotal vertical axis Pa, as shown in FIG. 8 and FIG. 9. At one end of the operational lever 830, there is formed a slit 831 in which a pin 832 fixed to the second leg portion 752. In operation, when the intermediate structure 6 is connected to the blade housing 40, in association with a pivotal operation of the operational lever 830, the coupling main body 70 is moved in the front/rear direction. This realizes connection (spline connection) to or disconnection from the input shaft 44b of the coupling main body 70 functioning as an output shaft of the vehicle-body side power transmission mechanism 25A.

Between the first leg portion 751 and the first bracket 653 and between the second leg portion 752 and the second bracket 654, there is provided respectively a spring 76 for urging in the direction for releasing the connection between the input shaft 44b of the power distribution mechanism 44 and the coupling main body 70 held to the coupling holding portion 730. Further, as shown in FIG. 5 and FIG. 6, on an outer face of the first member 61 of the intermediate structure 6, there is fixed a stopper plate 833 for holding the operational lever 830 at a pivotal position for interconnecting the coupling main body 70 and the input shaft 44b. The stopper plate 833 forms a downwardly opened cutout portion 834 having a substantially same width as the operational lever 830. This cutout portion 834 holds the operational lever 830 at a pivotal position for interconnecting the coupling main body 70 and the input shaft 44b. The operational lever 830 and the cutout portion 834 together constitute a first locking mechanism 8A of the locking mechanism 8.

Next, there will be described the locking mechanism 8 for locking attachment of the mower unit 4 to the vehicle body 1. The locking mechanism 8 includes the first locking mechanism 8A for locking the coupling holding portion 73 at the connected position and the second locking mechanism 8B for locking the engaging portion 610 and the engaged portion 620 at the engaged position. The first locking mechanism 8A and the second locking mechanism 8B are linked to each other via a lock linking link 840, as may be understood from the FIGS. 9 through 11 illustrations.

Between the rear end portion of the first member 61 and the rear end portion of the second member 62 and forwardly of the rear connecting member 64 and parallel with this rear connecting member 64, a rotational operational shaft 880 is provided rotationally. On this rotational operational shaft 880, a pair of right and left locking engagement pieces 820 are fixed in a spaced apart relationship. Further, on this rotational operational shaft 880, a connecting arm 841 is fixed. This connecting arm 841 is link-connected with a connecting plate 655 via a lock connecting link 840. With this, sliding displacement of the first leg portion 751 and the second leg portion 752 is transmitted to the connecting arm 841, whereby the rotational operational shaft 880 is rotated. The locking engagement pieces 820 are hook-like arms. The locking engagement pieces 820 are engaged with the locking rod 800 fixed to the blade housing 40, in association with the above rotation of the rotational operational shaft 880.

Pivotal displacement of the operational lever 830 for operably connecting the coupling main body 70 functioning as an output shaft of the vehicle-body side power transmission mechanism 25A and the input shaft 44b is converted into a rotational displacement for engaging the locking engagement pieces 820 with the locking rod 800. That is, as described above, the operational lever 830 and the slit 844 of the stopper plate 833 constitute the first locking mechanism 8A as one of the locking mechanisms 8. And, the locking engagement pieces 820, the locking rod 800 and the lock connecting link 840 together constitute the second locking mechanism 8B as one of the locking mechanisms 8.

Figure 12:
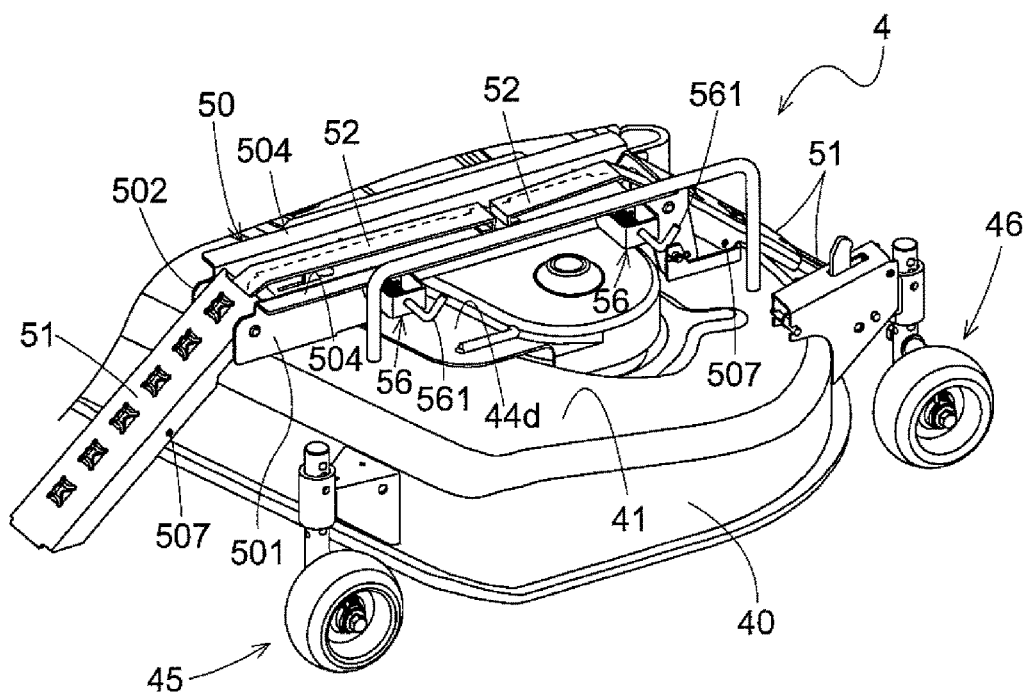
FIG. 12 is a perspective view showing the ride-over deck unit at a bridging position.

The grass mower according to the present invention forwardly travels and rides over the mower unit 4 disposed on the ground surface with lateral orientation when the mower unit 4 is to be attached to the vehicle body 1. To this end, as shown in FIG. 9, the top plate 41 of the blade housing 40 includes the pair of right and left ride-over deck units 5. The pair of right and left ride-over units 5 are provided respectively for the right and left front wheels 2a, and a spacing therebetween corresponds to the front wheel tread width. Each ride-over deck unit 5 includes the support deck 50 fixed to the upper face of the top plate 41, the two front and rear wheel guide members 51 and the two tethering members 52 for tethering the support deck 50 with the respective wheel guide members 51. The wheel guide member 51 is switchable between the home position for its storage in the support deck 50 and the bridging position for bridging between the support deck 50 and the ground surface. FIG. 11 shows the wheel guide member 51 located at its home position. FIG. 12 shows its condition shifted from the home position to the bridging position.

Figure 13:
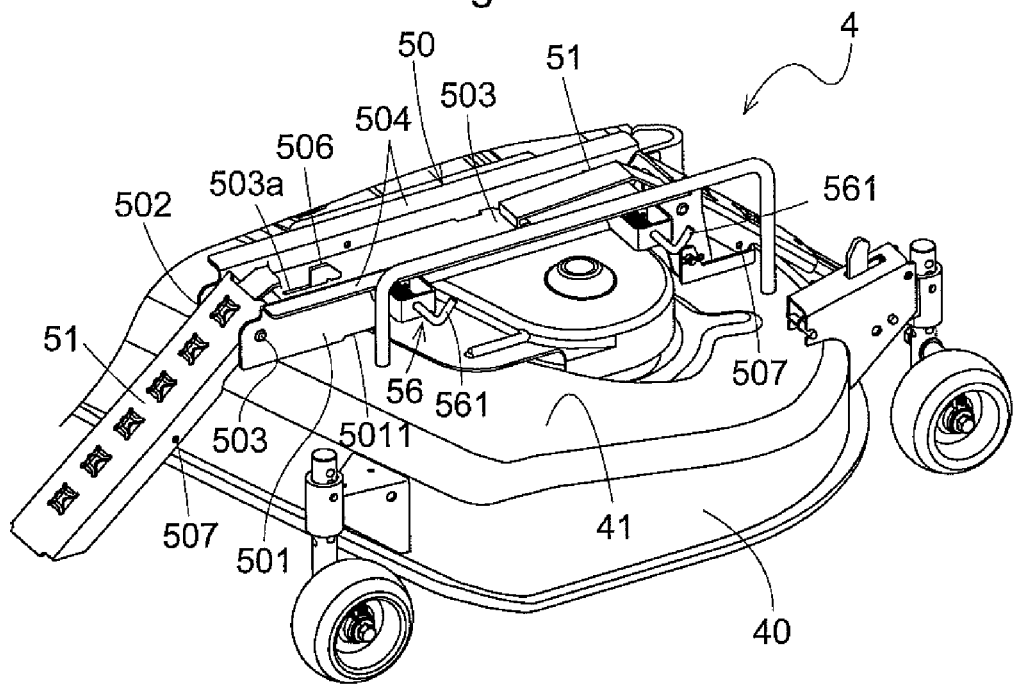
FIG. 13 is a perspective view showing the ride-over deck unit with a tethering main body portion being omitted at the bridging position.

The support deck 50 includes a left side wall 501 and a right side wall 502 which extend along the vehicle body front/rear direction in a spaced apart relationship with each other. The left side wall 501 and the right side wall 502 are connected to each other via a bottom plate 503. The left side wall 501 and the right side wall 502 respectively includes a receiving plate portion 504 which extends horizontally with its upper end being bent 90 degrees to the outer side. When the grass mower rides over the mower unit 4, each front wheel 2a rolls on this receiving plate portion 504. As shown in FIG. 13, a hook 506 is provided to extend vertically from the top plate 41 of the blade housing 40. Whereas, the bottom plate 503 of the support deck 50 defines a slit 503a through which this hook 506 can pass. In operation, the hook 506 will be inserted into the slit 503a and the support deck 50 will be placed on the top plate 41. Further, the support deck 50 will be moved in the front/rear direction so that the bottom plate 503 may be pressed by a beak portion of the hook 506 projecting from the slit 503a. After establishment of engagement between the hook 506 and the bottom plate 503, the support deck 50 will be retained by an unillustrated pin, whereby the support deck 50 will be detachably fixed to the top plate 41 of the blade housing 40. The left side wall 501 and the right side wall 502 are connected to each other with cross pins 53 at its end regions located on the outer side in the front/rear direction of the mower unit 4.

Figure 14:
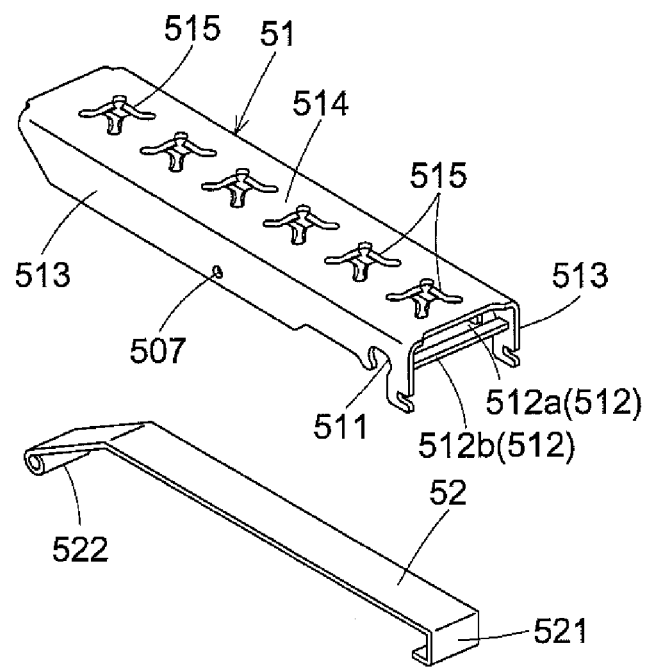
FIG. 14 is a perspective view showing an exploded wheel guide member and a tethering member.

As shown in FIG. 14, in this embodiment, the wheel guide member 51 is provided in the form of a channel, including right and left side face portions 513 and an upper face portion 514. The width of the wheel guide member 51 is substantially same as the spacing between the left side wall 501 and the right side wall 502 of the support deck 50. When located at its home position, the right and left side wall portions 513 of the wheel guide member 51 will come into contact with the right and left side face portions 513 of the wheel guide member 51, thus restricting movement of the wheel guide member 51 in the right/left direction. At the bridging posture where the wheel guide member 51 assumes an inclined posture to act as a slope for the front wheel 2a, in order to realize contact with the ground surface for a larger area, the ground-contacting side end portion of the wheel guide member 51 is cut off obliquely in correspondence with the slope angle. The upper face portion 514 includes a plurality of projecting portions 515 as non-slipping treated portions provided by a predetermined interval in the longitudinal direction. These projecting portions 515 will be formed by forming cross-shaped cuts in the upper face portion 514 and then bending four tongue pieces created by the cuts to form upward dome-like portions.

Further, at one end of the side face portions 513 of the wheel guide member 51, there are provided engaging holes 511 and retaining portions 512. Each engaging hole 511 is formed to be opened downwards so as to allow engagement of the cross pin 53 of the support deck 50. With engagement between the engaging holes 511 and the cross pins 53, the wheel guide member 51 will be maintained under a stable slope posture. Each retaining portion 712 is disposed adjacent the engaging hole 511. In this embodiment, the retaining portion 512 consists of a cross bar 512b interposed between the right and left side face portions 513 and a slit 512a provided between this cross bar 512b and the upper face portion 514. The cross bar 512b and the slit 512a together function as the retaining portion 512 configured to restrict movement of the tethering member 52 within a predetermined range in the longitudinal direction.

As shown in FIG. 14, the side face portion 513 which is disposed on the outer side in the width direction, includes a through hole 516. Further, the left side wall 501 or the right side wall 502 of the support deck 50 defines a through hole 507 also to be coaxial with the through hole 516 in the front wheel guide member 51 located at its home position (FIG. 10). A lock pin mechanism 56 including a lock pin 561 which is to be inserted into the through hole 507 and the through hole 516 is provided in the support deck 50. This lock pin 561 is urged by a spring in a direction for its insertion into the through hole 507 and the through hole 516. As the through hole 507 and the through hole 516 are fixed in position coaxially with each other, locking of the wheel guide member 51 by the lock pin mechanism 56 is realized.

In this embodiment, the tethering member 52 is comprised of a narrow elongate plate member and one end thereof is formed as a hook portion 521 having two 90 degree-curved portions and the other end thereof is coiled in a cylindrical form to function as a boss portion 522. On one hand, the tethering member 52 is pivotally attached to the support deck 50, with the cross pin 53 of the support deck 50 passing through the boss portion 522. On the other hand, the tethering member 52 is assembled to the wheel guide member 51, with the hook portion 521 extending through the slit 512a of the wheel guide member 51. When the wheel guide member 51 is located at the home position, the tethering member 52 is located between the bottom plate 503 of the support deck 50 and the upper face portion 514 of the wheel guide member 51. When the wheel guide member 51 is shifted from the home position to the bridging position, the tethering member 52 will be pivoted about the cross pin 53 of the support deck 50, whereby the wheel guide member 51 is guided by the tethering member 52 inserted in the slit 512a. When the wheel guide member 51 reaches the bridging position, the tethering member 52 alone will be pivoted about the cross pin 53 to be stored in the support deck 50. The height of the tethering member 52 stored in the support deck 50 from the bottom plate 503 is made slightly lower than the lateral face portion 513 of the support deck 50. With this arrangement, when the front wheel 2a passes over the receiving plate portion 504, pressing of the tethering member 52 by the downwardly bulging portion of the front wheel 2a is avoided.

Incidentally, in the foregoing explanation of this embodiment, it has been explained that the wheel guide member 51 comprises a single component. However, as shown in FIGS. 8 through 10, in this embodiment, the rear side wheel guide member 51 is divided into a first guide member 51A and a second guide member 51B. The second guide member 51B is slidably assembled in a nested arrangement to the first guide member 51A so as to compensate for a length of the first guide member 51A. At the home position, the second guide member 51B is accommodated within the first guide member 51A, thus becoming shorter in the total length. At the bridging position, the second guide member 51B is extended from the first guide member 51A, thus becoming longer in the total length, so that a gentle slope can be formed.

Figure 15:
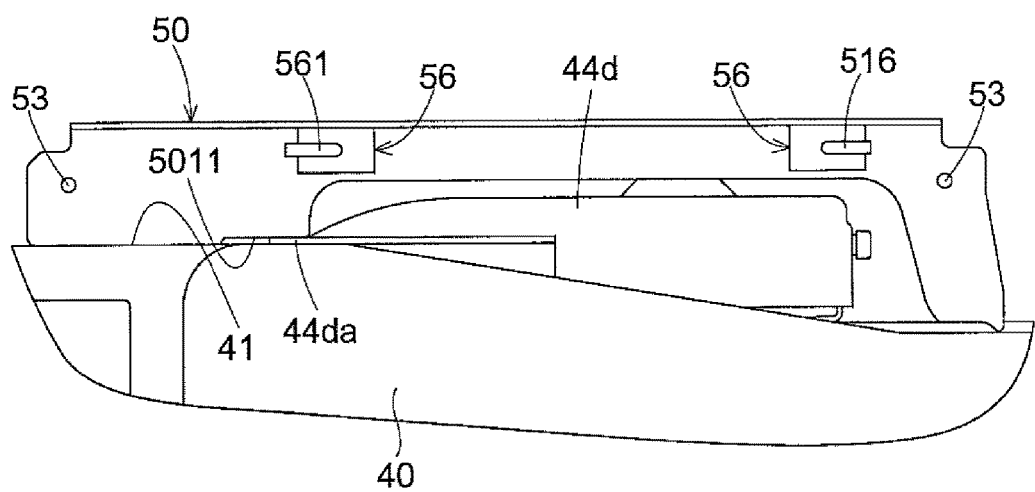
FIG. 15 is a diagram showing pressing of a belt cover by a support deck.
Figure 16A:
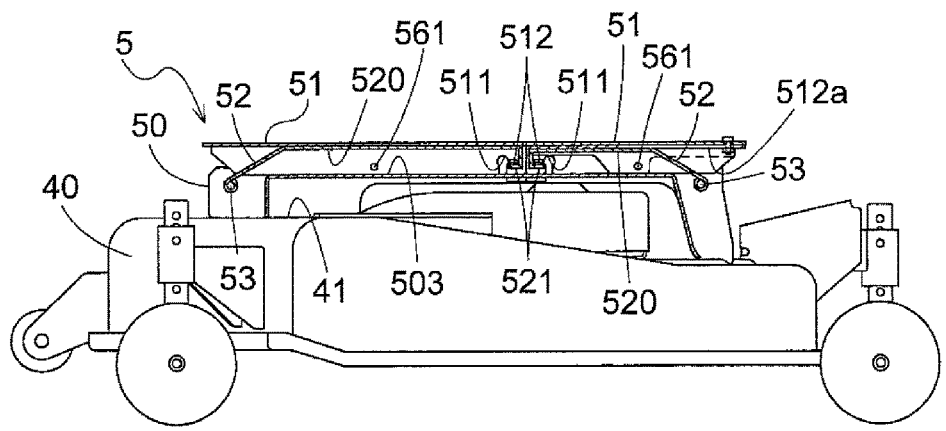
FIG. 16A is a side view illustrating one step in a process of shifting a wheel guide member of the ride-over deck unit from the home position to the bridging position.
Figure 16B:
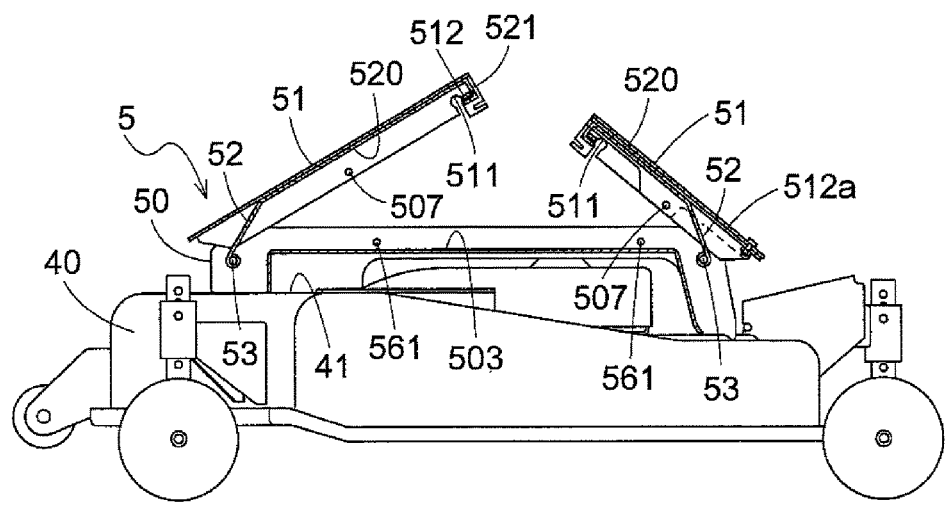
FIG. 16B is a side view illustrating one step in a process of shifting a wheel guide member of the ride-over deck unit from the home position to the bridging position.
Figure 16C:
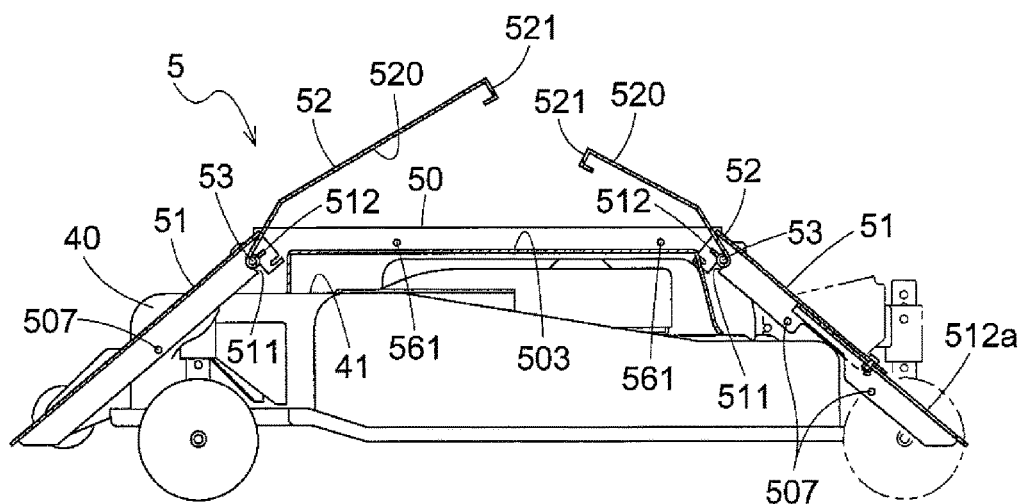
FIG. 16C is a side view illustrating one step in a process of shifting a wheel guide member of the ride-over deck unit from the home position to the bridging position.

As shown in FIG. 15, downwardly of the center region of the support deck 50, a belt cover 44d is disposed. In order to avoid interference with this belt cover 44d, a cutout 5011 is provided in the left side wall 501 and the right side wall 502 of the support deck 50. The rear end of the belt cover 44d is attached to the blade housing 40 with use of a quick clipping tool such as a knob nut. The front end of the belt cover 44d is formed as a horizontal plate portion 44da extending in the form of a flange. As this horizontal plate portion 44da causes the front edge portion of the cutouts 5011 provided in the left side wall 501 and the right side wall 502 to be pressed against the blade housing 40, the front end of the belt cover 44d is fixed.

In order to mount the mower unit 4 to the lower body portion of the tractor, the intermediate structure 6 will be lowered in advance to its lower limit position by an operation of the lift link mechanism 3. The mower unit 4 will be placed forwardly of the gross mower. After releasing the lock pin mechanism 65, as shown in FIG. 16A, FIG. 16B, FIG. 16C, FIG. 17A, FIG. 17B, the four wheel guide members 51 of the ride-over units 5 will be shifted from the home position to the bridging position. Then, the vehicle body 1 will be advanced so that the front wheels 2a ride over the blade housing 40 past above this blade housing 40 from the rear side of the mower unit 4, with utilization of the ride-over units 5. When the front wheels 2a have ridden over the blade housing 40, the engaging portions 610 (four guides 611-614 on the front, rear and right and left sides) provided in the intermediate structure 6 will come into engagement with the engaged portions 620 (four guides 621-624 on the front, rear and right and left sides) provided in the blade housing 40. More particularly, the engaging pins 69A provided in the vehicle body side first front guide 611 and the vehicle body side second front guide 612 will be guided by the respective guide faces 630 to enter the slots 69B provided in the mower side first front guide 621 and the mower side second front guide 622. In the course of this, the vehicle body side first rear guide 613 and the vehicle body side second rear guide 614 will come into face-contact with the mower side first rear guide 623 and the mower side second rear guide 624 respectively to enter the regions restricted by the mower side first rear guide 623 and the mower side second rear guide 624. When the front wheels 2a have ridden past over the blade housing 40, the vehicle body 1 will be stopped.

At this point, the axis of the coupling main body 70 of the power connecting mechanism 7 provided in the intermediate structure 6 will be positioned on the axis of the input shaft 44b projecting rearwards in the vehicle body front/rear direction of the power distribution mechanism 44 of the mower unit 4. Thus, the input shaft 44b and the coupling main body 70 will be aligned coaxially in the vehicle body front/rear direction.

After the vehicle body 1 is stopped, by a pivotal operation of the operational lever 830 by the driver, the operational lever 830 will enter the slit 831. One one hand, this pivotal displacement of the operational lever 830 realizes connection between the coupling main body 70 acting as an output shaft of the vehicle body side power transmission mechanism 25A and the input shaft 44b and this condition is maintained by the function of the first locking mechanism 8A. On the other hand, the above pivotal displacement realizes engagement of the locking engagement pieces 320 with the locking fixing rod 800 and this condition is maintained by the function of the second locking mechanism 8B. Thereafter, the four wheel guide members 1 of the ride-over deck units 5 will be shifted from the bridging position to the home position, and the wheel guide members 51 will be fixed to the support decks 50 with using the lock pin mechanism 56.

When the mower unit 4 is to be detached from the vehicle body 1, the lower link mechanism 3 will be lowered to bring the mower unit 4 into contact with the ground surface. Then, the lock pin mechanism 56 will be released to allow shifting of the four wheel guide members 51 of the ride-over units 5 from the home position to the bridging position. Further, the driver will remove the operational lever 830 from the slit 831. With this, the operational lever 830 now removed from the slit 831 will be pivoted to the home position by the urging force of the spring 76. On one hand, this pivotal displacement of the operational lever 830 realizes detachment between the coupling main body 70 acting as an output shaft of the vehicle body side power transmission mechanism 25A and the input shaft 44b. On the other hand, this pivotal displacement realizes detachment of the locking engagement pieces 820 from the locking fixing rod 800. As a result, the connected state between the blade housing 40 and the intermediate structure 6 will be released. Further, the vehicle body 1 will be traveled in reverse so that the front wheels 2a ride over the blade housing 40 past above this blade housing 40 from the front side of the mower unit 4, with utilization of the ride-over units 5. With this reverse traveling, the engaging portions 610 (four guides 611-614 on the front, rear and right and left sides) provided in the intermediate structure 6 will be removed from the engaged portions 620 (four guides 621-624 on the front, rear and right and left sides) provided in the blade housing 40. When the front wheels 2a have ridden past over the blade housing 40, the mower unit 4 will become free. So, the four wheel guide members 51 of the ride-over deck units 5 will be shifted from the bridging position to the home position, and the wheel guide members 51 will be locked with using the lock pin mechanism 56.

FIG. 18 shows a wire tethering member 52A formed of a wire such as a piano wire forming the outer contour of the member 52A, instead of the plate-like tethering member 52.

The present invention is applicable to a grass mower with a variety of mower units 4 being detachably mounted between the front wheels 2a and the rear wheels 2b, the mower unit 4 allowing riding over of the right and left front wheels 2a. The present invention is not limited to the above-described configurations of the lift link mechanism 3 and the mower unit 4.

The invention claimed is:

1. A mower unit detachably mounted between front wheels and rear wheels of a mid-mount grass mower, the mower unit comprising:
   a blade cover including;
      a top plate, and
      a side plate extending from a circumferential edge of the top plate;
   a pair of right and left ride-over deck units provided on the top plate, each ride-over deck unit including;
      a support deck fixed to an upper face of the top plate,
      a wheel guide member movable between a home position for storage in the support deck and a bridging position for bridging between the support deck and a ground surface, and
      a tethering member for tethering the support deck with the wheel guide member,
   wherein the wheel guide member slides between and across the home position and the bridging position relative to the tethering member.

2. The mower unit according to claim 1, wherein:
   the support deck includes:
      a left side wall;
      a right side wall; and
      a cross pin interconnecting the left side wall and the right side wall;
   wherein at the home position, the wheel guide member is stored between the left side wall and the right side wall; and
   at the bridging position, the wheel guide member keeps an inclined posture with its one end supported by the cross pin.

3. The mower unit according to claim 2, wherein:
   one end of the tethering member is pivotally attached to the cross pin; and
   the other end of the tethering member is detachably attached to a retaining portion provided in the wheel guide member.

4. The mower unit according to claim 2, wherein the wheel guide member forms a receiving hole for receiving the cross pin at the bridging position.

5. The mower unit according to claim 1, wherein:
   the wheel guide member comprises a channel including right and left side face portions and an upper face portion; and
   at the home position, the right and left side wall portions come into contact with the support deck, thereby to restrain movement of the wheel guide member in the right/left direction.

6. The mower unit according to claim 3, wherein:
   the tethering member includes a tethering main body portion; and
   in the retaining portion provided in the wheel guide member, there is formed a slit through which the tethering main body portion passes when the tethering member moves from the home position to the bridging position.

7. The mower unit according to claim 1, wherein the tethering member comprises a plate member.

8. The mower unit according to claim 1, wherein the tethering member comprises a bar-like member.

9. The mower unit according to claim 1, wherein the tethering member comprises a wire.

10. The mower unit according to claim1, wherein
    one end of the tethering member is pivotally supported by the support deck; and upwardly pivoting the tethering member allows the movement of the wheel guide member from the home position.

11. The mower unit according to claim 1, wherein
the support deck further comprises a left side wall and a right side wall,
wherein the bridging position, the tethering member is positioned between the left side wall and the right wall, and an upper side portion of the tethering member comes at a lower level than upper ends of the left side wall and the right side wall.

12. The mower unit according to claim 1, wherein in the home position, the tethering member is positioned between a bottom portion of the support deck and an upper side portion of the wheel guide member.

\* \* \* \* \*

UNITED STATES PATENT AND TRADEMARK OFFICE
CERTIFICATE OF CORRECTION

| | | |
|---|---|---|
| PATENT NO. | : 9,699,962 B2 | |
| APPLICATION NO. | : 14/844258 | |
| DATED | : July 11, 2017 | |
| INVENTOR(S) | : Masayuki Akita et al. | |

It is certified that error appears in the above-identified patent and that said Letters Patent is hereby corrected as shown below:

In the Claims

Column 16, Line 65, Claim 10, delete "claim1," and insert -- claim 1, --

Column 17, Line 7, Claim 11, after "wherein" insert -- in --

Column 17, Line 8, Claim 11, after "right" insert -- side --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*